(12) United States Patent
Suh et al.

(10) Patent No.: US 9,887,749 B2
(45) Date of Patent: Feb. 6, 2018

(54) SYSTEM AND METHOD FOR QUANTIZATION OF ANGLES FOR BEAMFORMING FEEDBACK

(71) Applicant: Huawei Technologies Co., Ltd., Shenzhen (CN)

(72) Inventors: Jung Hoon Suh, Kanata (CA); Jun Zhu, Shanghai (CN); Osama Aboul-Magd, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/243,714

(22) Filed: Aug. 22, 2016

(65) Prior Publication Data

US 2017/0180019 A1 Jun. 22, 2017

Related U.S. Application Data

(60) Provisional application No. 62/268,361, filed on Dec. 16, 2015.

(51) Int. Cl.
*H04B 15/00* (2006.01)
*H04B 7/0456* (2017.01)
*H04B 7/0452* (2017.01)
*H04B 7/06* (2006.01)
*H04W 84/12* (2009.01)

(52) U.S. Cl.
CPC ......... *H04B 7/0456* (2013.01); *H04B 7/0452* (2013.01); *H04B 7/0617* (2013.01); *H04W 84/12* (2013.01)

(58) Field of Classification Search
CPC ... H04L 27/2035; H04L 27/2275; H04L 5/06; H04L 25/497; H04B 1/707

USPC .................................................. 375/259–352
See application file for complete search history.

(56) References Cited

U.S. PATENT DOCUMENTS

| 7,978,759 | B1 * | 7/2011 | Sarrigeorgidis | H04B 7/0413 375/231 |
| 8,204,103 | B1 * | 6/2012 | Sarrigeorgidis | H04B 7/0413 375/231 |
| 8,311,160 | B1 * | 11/2012 | Zhang | H04L 5/0023 341/173 |

(Continued)

FOREIGN PATENT DOCUMENTS

| CN | 102124683 A | 7/2011 |
| CN | 102811111 A | 12/2012 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE std 802.11 n; pp. 1-536.*

(Continued)

*Primary Examiner* — James M Perez
(74) *Attorney, Agent, or Firm* — Slater Matsil LLP (57) ABSTRACT

An embodiment method for beamforming feedback includes receiving a sounding packet for a beamforming transmission, performing planar rotation in accordance with the sounding packet to generate phi and psi angle values, quantizing the phi and psi angle values to a same bit resolution, and feeding back the quantized phi and psi angle values.

24 Claims, 4 Drawing Sheets

(56) References Cited

U.S. PATENT DOCUMENTS

| | | | | |
|---|---|---|---|---|
| 8,432,988 | B2* | 4/2013 | Sanayei | H04L 25/03343 375/267 |
| 9,332,449 | B2* | 5/2016 | Park | H04W 24/08 |
| 9,749,028 | B2* | 8/2017 | Suh | H04B 7/0619 |
| 2008/0043873 | A1* | 2/2008 | Ariyavisitakul | H04B 7/0617 375/267 |
| 2008/0212461 | A1* | 9/2008 | Pande | H04B 7/0626 370/203 |
| 2009/0233559 | A1* | 9/2009 | Guey | H04L 1/0693 455/69 |
| 2010/0002797 | A1* | 1/2010 | Sanayei | H04L 25/03343 375/267 |
| 2011/0122968 | A1* | 5/2011 | Jongren | H04B 7/0639 375/296 |
| 2013/0107912 | A1* | 5/2013 | Ponnampalam | H04L 27/0008 375/147 |
| 2013/0286959 | A1* | 10/2013 | Lou | H04W 72/04 370/329 |
| 2014/0093005 | A1* | 4/2014 | Xia | H04B 7/0617 375/267 |
| 2014/0177747 | A1* | 6/2014 | Ruiz Delgado | H04B 7/0452 375/267 |
| 2014/0301240 | A1* | 10/2014 | Park | H04B 7/0643 370/253 |
| 2016/0359532 | A1* | 12/2016 | Cao | H04B 7/0421 |
| 2017/0063438 | A1* | 3/2017 | Baik | H04B 7/0456 |
| 2017/0064568 | A1* | 3/2017 | Elsherif | H04W 24/02 |
| 2017/0078010 | A1* | 3/2017 | Suh | H04B 7/0417 |
| 2017/0079027 | A1* | 3/2017 | Chun | H04L 1/0026 |
| 2017/0111924 | A1* | 4/2017 | Josiam | H04W 24/10 |
| 2017/0180019 | A1* | 6/2017 | Suh | H04B 7/0452 |
| 2017/0195026 | A1* | 7/2017 | Ghosh | H04B 7/0617 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Std 802.11ac, Dec. 11, 2013, pp. 1-425.

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Std 802.11n, Oct. 29, 2009, pp. 1-536.

\* cited by examiner

SYSTEM AND METHOD FOR QUANTIZATION OF ANGLES FOR BEAMFORMING FEEDBACK

CROSS-REFERENCE TO RELATED APPLICATIONS

This application claims the benefit of U.S. Provisional Application No. 62/268,361, filed on Dec. 16, 2015, which application is hereby incorporated herein by reference.

TECHNICAL FIELD

The present invention relates to a system and method for wireless communications, and, in particular embodiments, to a system and method for quantization of angles for beamforming feedback.

BACKGROUND

Beamforming is a technique whereby a beamformer station directs a signal toward a beamformee station rather than broadcasting the signal in a substantially omnidirectional manner. A beamformer may be defined as a station that transmits a physical layer convergence procedure (PLCP) protocol data unit (PPDU) using a beamforming steering matrix. A beamformee may be defined as a station that receives a PPDU that was transmitted using a beamforming steering matrix. The beamformer station may be a component configured to provide wireless access to a network, such as an enhanced base station (eNB), a macrocell, a femtocell, a Wi-Fi access point, or some other wirelessly enabled device. Any such component will be referred to herein as an access point. An access point may provide wireless access in accordance with one or more wireless communication protocols, such as Long Term Evolution (LTE), LTE Advanced (LTE-A), High Speed Packet Access (HSPA), or Wi-Fi 802.11a/b/g/n/ac. The beamformee station may be a component capable of establishing a wireless connection with an access point, such as a user equipment (UE), a mobile station, or some other wirelessly enabled device. Any such component will be referred to herein as a station. While beamforming is typically employed in transmissions from access points to stations, it should be understood that a station may employ beamforming when transmitting to an access point. Further any station may simultaneously act as a beamformer and beamformee, while transmitting and receiving, respectively.

SUMMARY

An embodiment method for beamforming feedback includes receiving a sounding packet for a beamforming transmission, performing planar rotation in accordance with the sounding packet to generate phi and psi angle values, quantizing the phi and psi angle values to a same bit resolution, and feeding back the quantized phi and psi angle values.

An embodiment station includes a processor and a non-transitory computer readable storage medium storing programming for execution by the processor. The programming includes instructions for receiving a sounding packet for a beamforming transmission, performing planar rotation in accordance with the sounding packet to generate phi and psi angle values, quantizing the phi and psi angle values to a same bit resolution, and feeding back the quantized phi and psi angle values.

An embodiment method for beamforming feedback includes transmitting a sounding packet for a beamforming transmission, receiving feedback including quantized phi and psi angle values having a same bit resolution, beamforming transmit channels in accordance with the quantized phi and psi angle values, and transmitting the beamformed data.

An embodiment access point includes a processor and a non-transitory computer readable storage medium storing programming for execution by the processor. The programming includes instructions for transmitting a sounding packet for a beamforming transmission, receiving feedback including quantized phi and psi angle values having a same bit resolution, beamforming transmit channels in accordance with the quantized phi and psi angle values, and transmitting the beamformed data.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Beamforming is described in the Institute of Electrical and Electronics Engineers (IEEE) standards 802.11ac-2013 and 802.11n-2009, both of which are incorporated herein by reference in their entireties. Beamforming is, according to that standard, preceded by channel sounding. Specifically, the beamformer begins the process by transmitting a Null Data Packet (NDP) Announcement frame, which is used to gain control of the channel and identify beamformees. The beamformer follows the NDP Announcement with a null data packet. The receiver may analyze the Orthogonal Frequency Division Multiplexing (OFDM) training fields in the null data packet to calculate the channel response. For multi-user transmissions, multiple NDPs may be transmitted. A beamformee may analyze the training fields in the received NDP and calculate a feedback matrix. The feedback matrix is referred to by the letter V in the 802.11ac specification. The beamformer receives the feedback matrix and calculates a steering matrix to direct transmissions toward the beamformee.

The information generated by the analysis of the channel conditions between the beamformee and the beamformer may take the form of a right singular matrix known as V. V may be highly complex and thus unsuitable for transmission in its raw form. To make the channel condition information more suitable for transmission, V may be transformed by a procedure known as a Givens rotation, which produces two angles known as phi ($\Phi$) and psi ($\Psi$). The beamformee quantizes the angles phi and psi and feeds the quantized angles back to the beamformer. The beamformer uses phi and psi to reconstruct V and thereby learns the channel steering conditions between itself and the beamformee. The beamformer then uses the channel steering condition information to shape a beam for a transmission to the beamformee.

More specifically, the 802.11ac/n standards use Givens rotations to perform a planar rotation operation on a unitary matrix V. The operation results in the generation of the angles $\Phi$ and $\Psi$. After being converted to polar coordinates, the angles are quantized. The angles $\Phi$ are quantized between 0 and $2\pi$ and the angles $\Psi$ are quantized between 0 and $\pi/2$, as given by :

$$\Phi = \frac{k\pi}{2^{b_\phi - 1}} + \frac{\pi}{2^{b_\phi}},$$

where k=0,1, . . . , $2^{b_\phi}-1$ and $b_\phi$ is the number of bits to quantize $\Phi$ $$\Psi = \frac{k\pi}{2^{b_\psi + 1}} + \frac{\pi}{2^{b_\psi + 2}},$$

where k=0,1, . . . , $2^{b_\phi}-1$ and $b_\psi$ is the number of bits to quantize $\Psi$ The quantization bit resolutions per tone for phi and psi have a two bit difference with respect to each other in 802.11ac/n to keep the same mean square quantization error for both phi and psi. More specifically, the 802.ac/n standards call for the number of bits for phi to be two greater than the number of bits for psi. The specific number of bits used for each angle depends on whether single user multiple-input multiple-output (SU-MIMO) or multiple user-MIMO (MU-MIMO) is employed. For example, there may be four bits per tone for phi and two bits per tone for psi in the case of SU-MIMO and seven bits per tone for phi and five bits per tone for psi in the case of MU-MIMO.

Figure 1:
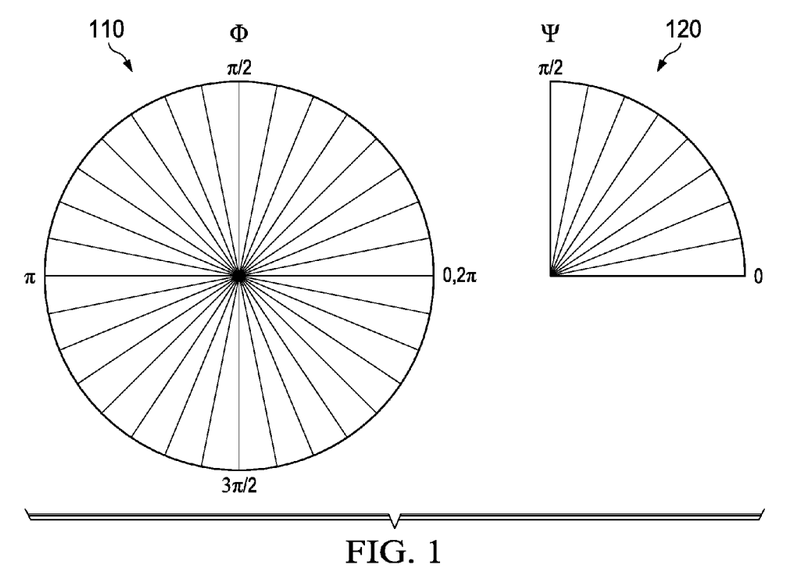
FIG. 1 is an angular representation of Givens rotation parameters.

FIG. 1 illustrates angular representations of Givens rotation parameters where the number of bits for phi ($b_\phi$)=5 and the number of bits for psi ($b_\psi$)=3. Since five bits are used for phi, $2^5$ or 32 values are possible for phi. Since three bits are used for psi, $2^3$ or 8 values are possible for psi. That is, four times as many values are possible for phi as for psi. Phi is quantized between 0 and $2\pi$, or a rotation through an entire circle 110. Psi is quantized between 0 and $\pi/2$, or a rotation through one quadrant 120 of a circle. Thus, with four times as many values for phi as for psi, and with phi quantized through a rotation four times as large as that for psi, the span between angles is the same for phi and psi. In other words, the same quantization steps are used for phi and psi, and therefore the granularity is the same for phi and psi, and the quantized resolutions are the same, in radians, for the two angle parameters. In this simplified representation of the proportional resolutions for the Givens rotations used to perform planar rotation operations, the values 5 and 3 were used for $b_{100}$ and $b_\psi$, respectively. Other values may be used in 802.1n and 802.ac wireless networks, but the relationship $b_\phi = b_\psi + 2$ is preserved in those standards.

The 802.11n and 802.11ac standards provide that the number of bits for phi and the number of bits for psi are to be specified in the Codebook Information subfield of the very high throughput (VHT) MIMO Control field in a beamforming action frame transmitted by a station. When the Codebook Information subfield is set to 0, two bits are used for psi and four bits are used for phi in the case of SU-MIMO. In the case of MU-MIMO, when the Codebook Information subfield is set to 0, five bits are used for psi and seven bits are used for phi. When the Codebook Information subfield is set to 1, four bits are used for psi and six bits are used for phi in the case of SU-MIMO. In the case of MU-MIMO, when the Codebook Information subfield is set to 1, seven bits are used for psi and nine bits are used for phi.

In the existing 802.11n and 802.11ac standards, the quantized resolutions, in radians, for both phi and psi are the same since two more bits are always used for phi than for psi. However, psi generally is more important than phi in Givens rotations. The series of Givens rotations below are an example of a representation of the V matrix.

$$\begin{bmatrix} 1 & 0 & 0 & 0 \\ 0 & \cos(\psi_{4,2}) & 0 & \sin(\psi_{4,2}) \\ 0 & 0 & 1 & 0 \\ 0 & -\sin(\psi_{4,2}) & 0 & \cos(\psi_{4,2}) \end{bmatrix} \begin{bmatrix} 1 & 0 & 0 & 0 \\ 0 & \cos(\psi_{3,2}) & \sin(\psi_{3,2}) & 0 \\ 0 & -\sin(\psi_{3,2}) & \cos(\psi_{3,2}) & 0 \\ 0 & 0 & 0 & 1 \end{bmatrix}$$

$$\begin{bmatrix} 1 & 0 & 0 & 0 \\ 0 & e^{j\phi_{2,2}} & 0 & 0 \\ 0 & 0 & e^{j\phi_{2,2}} & 0 \\ 0 & 0 & 0 & 1 \end{bmatrix}^* \begin{bmatrix} \cos(\psi_{4,1}) & 0 & 0 & \sin(\psi_{4,1}) \\ 0 & 1 & 0 & 0 \\ 0 & 0 & 1 & 0 \\ -\sin(\psi_{4,1}) & 0 & 0 & \cos(\psi_{4,1}) \end{bmatrix}$$

$$\begin{bmatrix} \cos(\psi_{3,1}) & 0 & \sin(\psi_{3,1}) & 0 \\ 0 & 1 & 0 & 0 \\ -\sin(\psi_{3,1}) & 0 & \cos(\psi_3, 1) & 0 \\ 0 & 0 & 0 & 1 \end{bmatrix} \begin{bmatrix} \cos(\psi_{2,1}) & \sin(\psi_{2,1}) & 0 & 0 \\ -\sin(\psi_{2,1}) & \cos(\psi_{2,1}) & 0 & 0 \\ 0 & 0 & 1 & 0 \\ 0 & 0 & 0 & 1 \end{bmatrix}$$

$$\begin{bmatrix} e^{j\phi_{1,1}} & 0 & 0 & 0 \\ 0 & e^{j\phi_{2,2}} & 0 & 0 \\ 0 & 0 & e^{j\phi_{3,3}} & 0 \\ 0 & 0 & 0 & 1 \end{bmatrix}^* V \begin{bmatrix} e^{j\theta_1} & 0 \\ 0 & e^{j\theta_2} \end{bmatrix}^* = \begin{bmatrix} 1 & 0 \\ 0 & 1 \\ 0 & 0 \\ 0 & 0 \end{bmatrix}$$

It can be seen that the psi angles in the Givens rotations are used more frequently than the phi angles. More specifically, psi appears in five of the seven 4×4 matrices, but phi appears in only two of the seven 4×4 matrices. Furthermore, in the matrices in which phi appears, phi affects only the diagonal elements. Therefore, phi may be considered less important than psi in Givens rotations. Thus, the difference of two bits between phi and psi may not be necessary, and an equal bit resolution for both phi and psi may be acceptable for performing beamforming feedback. That is, feedback overhead may be reduced at small cost of performance degradation by selecting a non-proportional quantization, i.e., $b_\phi \neq b_\psi + 2$.

An embodiment uses two fewer bits for quantizing the angle phi compared to the number of bits for quantizing phi specified in the 802.11 standards. In particular, in an embodiment, $b_\varphi = b_\psi$, where $b_\varphi$ is made equal to $b_\psi$ by reducing $b_\varphi$ by two bits. That is, an embodiment provides equal bit resolution for the angles in beamforming quantization. For example, in the case of SU-MIMO, two bits per tone may be used for both phi and psi, instead of four for phi and two for psi as currently specified in the 802.11 standards. Similarly, in the case of MU-MIMO, five bits per tone may be used for both phi and psi, instead of seven for phi and five for psi as currently specified in the 802.11 standards. In this way, the quantization overhead in the feedback of channel condition information for beamforming may be reduced.

In an embodiment, the meanings of the values in the Codebook Information subfield of the VHT MIMO Control field in a beamforming action frame transmitted by a station differ from the meanings specified in the current 802.11 standards. For example, in the case of single user feedback, a 0 in the Codebook Information subfield may indicate that two bits are used for both phi and psi, and a 1 in the Codebook Information subfield may indicate that four bits are used for both phi and psi. In the case of multiple user feedback, a 0 in the Codebook Information subfield may indicate that five bits are used for both phi and psi, and a 1 in the Codebook Information subfield may indicate that seven bits are used for both phi and psi. In other embodiments, the values of 0 and 1 in the Codebook Information subfield may indicate other numbers of bits, but in any case the number of bits is the same for phi and psi. The names of the Codebook Information subfield and the VHT MIMO Control field may differ in future 802.11 amendments, but the above binary values may apply to any equivalent fields.

In an embodiment, a subfield, which may be referred to as the Additional Quantization subfield, is added to the Per User Info field of the null data packet announcement (NDPA) transmitted by a beamformer as a sounding packet for use by a beamformee in analyzing channel conditions. A beamformer may set the Additional Quantization subfield to either 2 or 3 to indicate the number of bits to be used by a beamformee for phi and psi in SU-MIMO and MU-MIMO. In an embodiment, when the Additional Quantization subfield is set to 2, two bits are to be used for both phi and psi in the case of SU-MIMO. In the case of MU-MIMO, when the Additional Quantization subfield is set to 2, five bits are to be used for both phi and psi. When the Additional Quantization subfield is set to 3, four bits are to be used for both phi and psi in the case of SU-MIMO. In the case of MU-MIMO, when the Additional Quantization subfield is set to 3, seven bits are to be used for both phi and psi. In other embodiments, other values may be used in the Additional Quantization subfield, and the values in the Additional Quantization subfield may indicate that other numbers of bits are to be used for both phi and psi.

Figure 2:
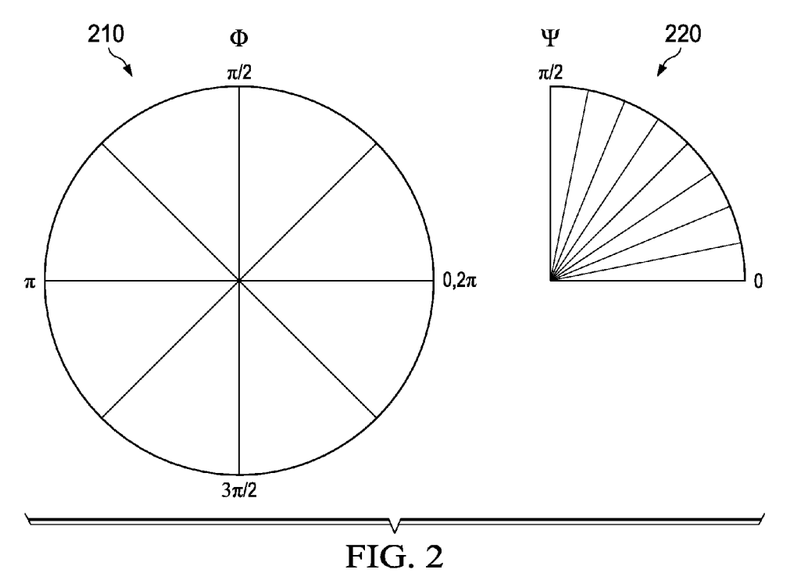
FIG. 2 is an angular representation of Givens rotation parameters based on a disclosed embodiment.

FIG. 2 is an embodiment angular representation of Givens rotation parameters used to perform planar rotation operations, based on the disclosed idea of equal bit allocation for both phi and psi, where $b_\varphi = 3$ and $b_\psi = 3$. Since $b_\varphi = b_\psi$ and the angle span of phi is four times the angle span of psi, the quantized resolution of phi is ¼ that of psi. That is, since three bits are used for both phi and psi, $2^3$ or 8 values are possible for both phi and psi. Phi is again quantized between 0 and $2\pi$ or a rotation through an entire circle 210, and psi is again quantized between 0 and $\pi/2$ or a rotation through one quadrant 220 of a circle. Thus, with an equal number of values for phi and for psi, and with phi quantized through a rotation four times as large as that for psi, the span between angles for phi is four times greater than that for psi. In other words, different quantization steps are used for phi and psi in this embodiment, and therefore the granularity is different for phi and psi. In particular, the granularity for phi is reduced compared to the granularity for psi, and the quantized resolutions are different for the two angle parameters. Other values may be used for $b_\varphi$ and $b_\psi$ in other embodiments, but the relationship $b_\varphi = b_\psi$ is preserved in the embodiments.

Figure 3:
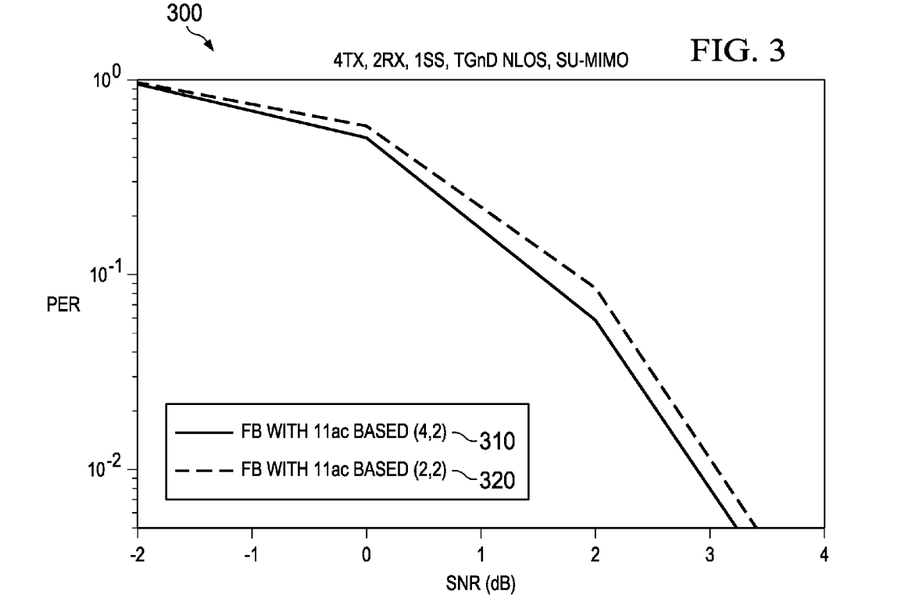
FIG. 3 illustrates simulation results for single user beamforming.

Simulations were performed to compare the 4/2 bits per angle quantization specified in the 802.11 standards for single user beamforming to the embodiment 2/2 bits per angle quantization for single user beamforming. A single beamformer was used with one spatial stream and four transmission antennas. The beamformee had two receive antennas. Further simulation parameters included a Task Group n with a channel D model (TGnD), non-line-of-sight (NLOS), minimum mean square error (MMSE) interference cancellation detection, quadrature phase shift keying (QPSK) with rate ½ binary convolutional coding (BCC) with a Viterbi Decoder, and measurement of the packet error rate (PER) with a packet size of 200 bytes. In the simulations, very minimal performance degradation was observed with the embodiment equal bit resolution for both phi and psi. FIG. 3 illustrates simulation results 300 for single user beamforming. It can be seen that, when the 802.11-based 4 bits for phi/2 bits for psi case 310 is compared to the embodiment 2 bits for phi/2 bits for psi case 320, there is only a 0.3 decibel (dB) performance degradation in the 2 bits for phi/2 bits for psi case 320, while feedback overhead is reduced by 33%.

Figure 4:
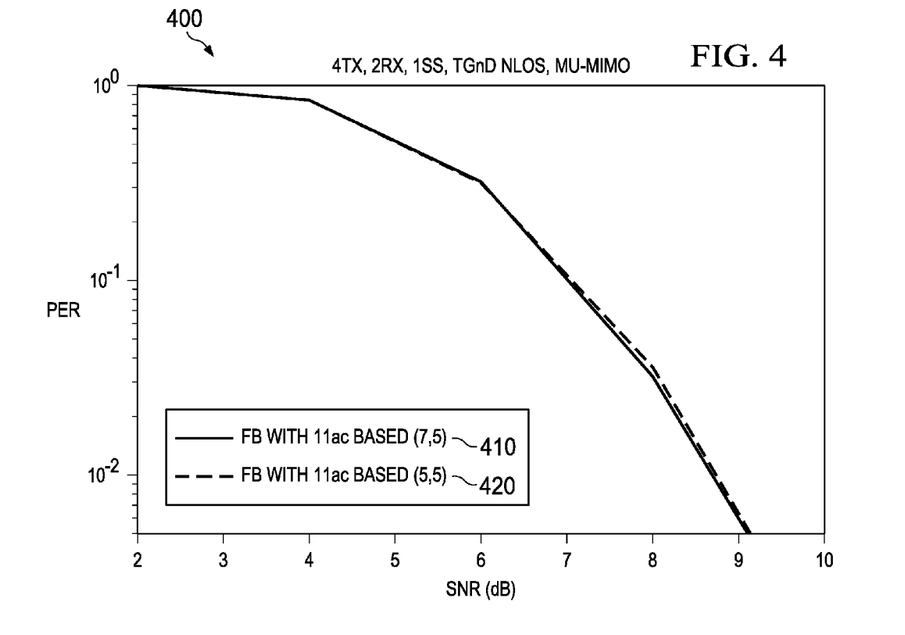
FIG. 4 illustrates simulation results for multiple user beamforming.

Additional simulations were performed to compare the 7/5 bits per angle quantization specified in the 802.11 standards for multi-user beamforming to the embodiment 5/5 bits per angle quantization for multi-user beamforming. A single beamformer was used with one spatial stream per station and four transmission antennas. Two beamformees were used with two receive antennas per station. Further simulation parameters included TGnD NLOS, MMSE detection, QPSK with rate ½ BCC with a Viterbi Decoder, and PER with a packet size of 200 bytes. FIG. 4 illustrates simulation results 400 for multi-user beamforming. It can be seen that, when the 802.11-based 7 bits for phi/5 bits for psi case 410 is compared to the embodiment 5 bits for phi/5 bits for psi case 420, overhead is reduced by 17% with almost no degradation in the 5 bits for phi/5 bits for psi case 420.

Figure 5:
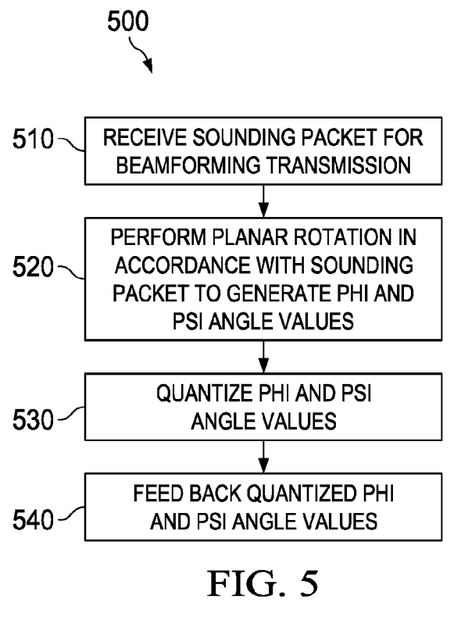
FIG. 5 is a flowchart of an embodiment method for beamforming feedback.

FIG. 5 is a flowchart of an embodiment method 500 for beamforming feedback. At block 510, a sounding packet for a beamforming transmission is received. At block 520, a planar rotation is performed in accordance with the sounding packet to generate phi and psi angle values. At block 530, the phi and psi angle values are quantized to the same bit resolution. At block 540, the quantized phi and psi angle values are fed back.

Figure 6:
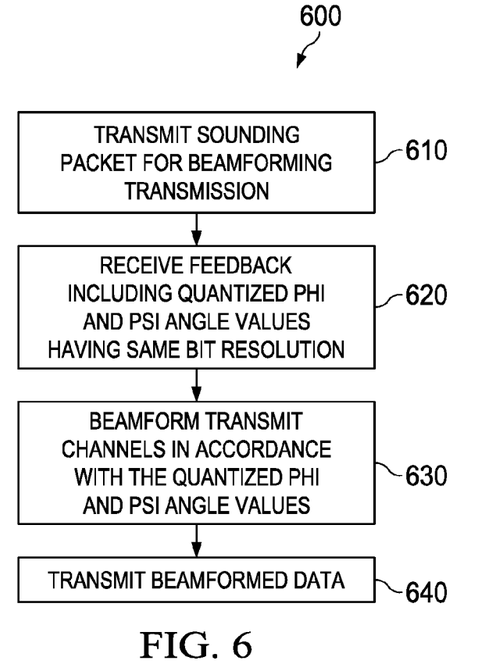
FIG. 6 is a flowchart of an alternative embodiment method for beamforming feedback.

FIG. 6 is a flowchart of an alternative embodiment method 600 for beamforming feedback. At block 610, a sounding packet for a beamforming transmission is transmitted. At block 620, feedback including quantized phi and psi angle values having the same bit resolution is received. At block 630, transmit channels are beamformed in accordance with the quantized phi and psi angle values. At block 640, the beamformed transmit channels are transmitted.

Figure 7:
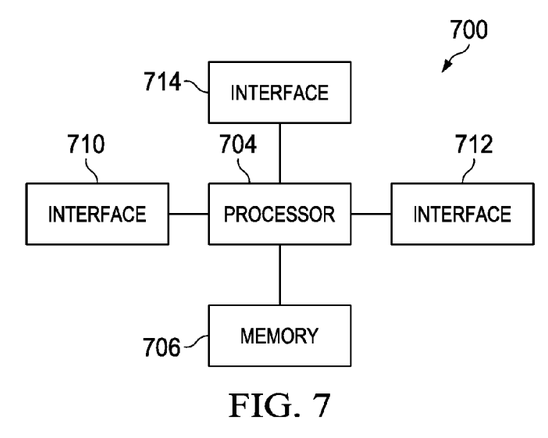
FIG. 7 illustrates a block diagram of an embodiment processing system for performing methods described herein.

FIG. 7 illustrates a block diagram of an embodiment processing system 700 for performing methods described herein, which may be installed in a host device such as a WLAN beamformer or beamformee. As shown, the processing system 700 includes a processor 704, a memory 706, and interfaces 710-614, which may (or may not) be arranged as shown in the figure. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in the figure, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
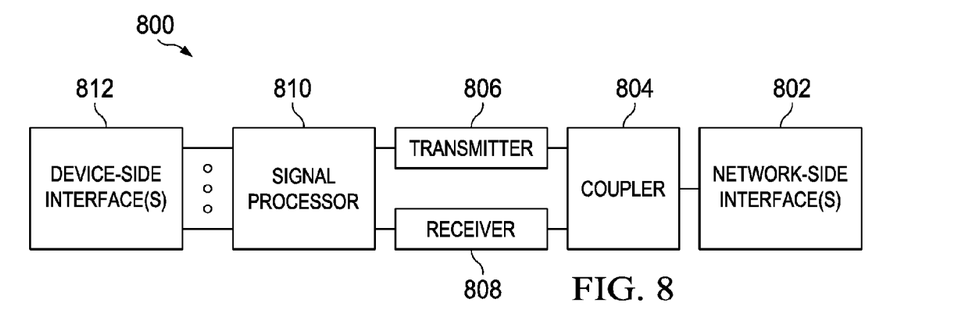
FIG. 8 illustrates a block diagram of a transceiver adapted to transmit and receive signaling over a telecommunications network.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a performing unit/module, a quantizing unit/module, a feedback unit/module, a setting unit/module, and/or a beamforming unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for beamforming feedback comprising:
receiving a sounding packet for a beamforming transmission;
performing planar rotation in accordance with the sounding packet to generate phi and psi angle values;
quantizing the phi and psi angle values to a same bit resolution; and
feeding back the quantized phi and psi angle values.

2. The method of claim 1, wherein the planar rotation is a Givens rotation.

3. The method of claim 1, wherein quantizing the phi and psi angle values to the same bit resolution comprises using a first number of bits for quantizing phi that has been set to be equal to a second number of bits for quantizing psi.

4. The method of claim 1, further comprising, in a case of single user feedback, setting a Codebook Information subfield of a very high throughput (VHT) multiple-input multiple-output (MIMO) Control field specified in an Institute of Electrical and Electronics Engineers (IEEE) 802.11 standard to 0 to indicate that a first number of bits are used for both phi and psi, and setting the Codebook Information subfield to 1 to indicate that a second number of bits are used for both phi and psi.

5. The method of claim 4, further comprising, in a case of multiple user feedback, setting the Codebook Information subfield to 0 to indicate that a third number of bits are used for both phi and psi, and setting the Codebook Information subfield to 1 to indicate that a fourth number of bits are used for both phi and psi.

6. The method of claim 1, wherein the sounding packet is a null data packet announcement (NDPA) received from a beamformer, wherein the NDPA includes a subfield added to a Per User Info field, wherein, when the subfield is set to a first value, a first number of bits are used for both phi and psi in a case of single user (SU)-MIMO and a second number of bits are used for both phi and psi in a case of multiple user (MU)-MIMO, and wherein, when the subfield is set to a second value, a third number of bits are used for both phi and psi in the case of SU-MIMO and a fourth number of bits are used for both phi and psi in the case of MU-MIMO.

7. A station comprising:
a non-transitory memory storage comprising instructions; and
one or more processors in communication with the memory, wherein the one or more processors execute the instructions for:
receiving a sounding packet for a beamforming transmission;
performing planar rotation in accordance with the sounding packet to generate phi and psi angle values;
quantizing the phi and psi angle values to a same bit resolution; and
feeding back the quantized phi and psi angle values.

8. The station of claim 7, wherein the planar rotation is a Givens rotation.

9. The station of claim 7, wherein quantizing the phi and psi angle values to the same bit resolution comprises using a first number of bits for quantizing phi that has been set to be equal to a second number of bits for quantizing psi.

10. The station of claim 7, further comprising the one or more processors executing the instructions for, in a case of single user feedback, setting a Codebook Information subfield of a very high throughput (VHT) multiple-input multiple-output (MIMO) Control field specified in an Institute of Electrical and Electronics Engineers (IEEE) 802.11 standard to 0 to indicate that a first number of bits are used for both phi and psi, and setting the Codebook Information subfield to 1 to indicate that a second number of bits are used for both phi and psi.

11. The station of claim 10, further comprising the one or more processors executing the instructions for, in a case of multiple user feedback, setting the Codebook Information subfield to 0 to indicate that a third number of bits are used for both phi and psi, and setting the Codebook Information subfield to 1 to indicate that a fourth number of bits are used for both phi and psi.

12. The station of claim 7, wherein the sounding packet is a null data packet announcement (NDPA) received from a beamformer, wherein the NDPA includes a subfield added to a Per User Info field, wherein, when the subfield is set to a first value, the one or more processors execute the instructions to use a first number of bits for both phi and psi in a case of single user (SU)-MIMO and use a second number of bits for both phi and psi in a case of multiple user (MU)-MIMO, and wherein, when the subfield is set to a second value, the one or more processors execute the instructions to use a third number of bits for both phi and psi in the case of SU-MIMO and use a fourth number of bits for both phi and psi in the case of MU-MIMO.

13. A method for beamforming feedback comprising:
transmitting a sounding packet for a beamforming transmission;
receiving feedback including quantized phi and psi angle values having a same bit resolution;
beamforming transmit channels in accordance with the quantized phi and psi angle values; and
transmitting the beamformed transmit channels.

14. The method of claim 13, wherein the phi and psi angle values have been quantized in accordance with a Givens rotation.

15. The method of claim 13, wherein a first number of bits for quantizing phi has been set to be equal to a second number of bits for quantizing psi.

16. The method of claim 13, further comprising, in a case of single user feedback, processing a value of 0 in a Codebook Information subfield of a very high throughput (VHT) multiple-input multiple-output (MIMO) Control field specified in an Institute of Electrical and Electronics Engineers (IEEE) 802.11 standard as an indication that a first number of bits are used for both phi and psi, and processing a value of 1 in the Codebook Information subfield as an indication that a second number of bits are used for both phi and psi.

17. The method of claim 16, further comprising, in a case of multiple user feedback, processing a value of 0 in the Codebook Information subfield as an indication that a third number of bits are used for both phi and psi, and processing a value of 1 in the Codebook Information subfield as an indication that a fourth number of bits are used for both phi and psi.

18. The method of claim 13, wherein the sounding packet is a null data packet announcement (NDPA), wherein the NDPA includes a subfield added to a Per User Info field, wherein, when a first number of bits are to be used for both phi and psi in a case of single user (SU)-MIMO and a second number of bits are to be used for both phi and psi in a case of multiple user (MU)-MIMO, the subfield is set to a first value, and wherein, when a third number of bits are to be used for both phi and psi in the case of SU-MIMO and a fourth number of bits are to be used for both phi and psi in the case of MU-MIMO, the subfield is set to a second value.

19. An access point comprising:
a non-transitory memory storage comprising instructions; and
one or more processors in communication with the memory, wherein the one or more processors execute the instructions for:
transmitting a sounding packet for a beamforming transmission;
receiving feedback including quantized phi and psi angle values having a same bit resolution;
beamforming transmit channels in accordance with the quantized phi and psi angle values; and
transmitting the beamformed transmit channels.

20. The access point of claim 19, wherein the phi and psi angle values have been quantized in accordance with a Givens rotation.

21. The access point of claim 19, wherein a first number of bits for quantizing phi has been set to be equal to a second number of bits for quantizing psi.

22. The access point of claim 19, further comprising the one or more processors executing the instructions for, in a case of single user feedback, processing a value of 0 in a Codebook Information subfield of a very high throughput (VHT) multiple-input multiple-output (MIMO) Control field specified in an Institute of Electrical and Electronics Engineers (IEEE) 802.11 standard as an indication that a first number of bits are used for both phi and psi, and processing a value of 1 in the Codebook Information subfield as an indication that a second number of bits are used for both phi and psi.

23. The access point of claim 22, further comprising the one or more processors executing the instructions for, in a case of multiple user feedback, processing a value of 0 in the Codebook Information subfield as an indication that a third number of bits are used for both phi and psi, and processing a value of 1 in the Codebook Information subfield as an indication that a fourth number of bits are used for both phi and psi.

24. The access point of claim 19, wherein the sounding packet is a null data packet announcement (NDPA), wherein the NDPA includes a subfield added to a Per User Info field, wherein, when a first number of bits are to be used for both phi and psi in a case of single user (SU)-MIMO and a second number of bits are to be used for both phi and psi in a case of multiple user (MU)-MIMO, the one or more processors execute the instructions to set the subfield to a first value, and wherein, when a third number of bits are to be used for both phi and psi in the case of SU-MIMO and a fourth number of bits are to be used for both phi and psi in the case of MU-MIMO, the one or more processors execute the instructions to set the subfield to a second value.

\* \* \* \* \*